United States Patent
Yoshida

Patent Number: 5,946,104
Date of Patent: Aug. 31, 1999

[54] DATA COMMUNICATION APPARATUS FOR SETTING DATA TRANSMISSION RATE IN ACCORDANCE WITH COMMUNICATION PROCESSING ABILITY

[75] Inventor: Takehiro Yoshida, Tokyo, Japan

[73] Assignee: Canon Kabushiki Kaisha, Tokyo, Japan

[21] Appl. No.: 08/854,775

[22] Filed: May 12, 1997

Related U.S. Application Data

[63] Continuation of application No. 08/504,416, Jul. 20, 1995.

[30] Foreign Application Priority Data

Jun. 13, 1995 [JP] Japan .................................. 7-146244

[51] Int. Cl.$^6$ ..................................................... H04N 1/36
[52] U.S. Cl. ........................................... 358/412; 358/409
[58] Field of Search .................................. 358/412, 405, 358/406, 468, 434–441; 395/821; 375/222, 358, 377; 379/100.01–100.06

[56] References Cited

U.S. PATENT DOCUMENTS

| | | | |
|---|---|---|---|
| 4,583,124 | 4/1986 | Tsuji et al. | 358/412 |
| 4,729,033 | 3/1988 | Yoshida | 358/435 |
| 4,814,894 | 3/1989 | Yoshida | 358/298 |
| 4,829,524 | 5/1989 | Yoshida | 371/32 |
| 4,885,755 | 12/1989 | Yoshida | 375/285 |
| 4,922,348 | 5/1990 | Gillor et al. | 358/434 |
| 5,031,179 | 7/1991 | Yoshida et al. | 371/32 |
| 5,050,004 | 9/1991 | Morton, Jr. | 358/434 |
| 5,105,423 | 4/1992 | Tanaka et al. | 358/412 |
| 5,172,246 | 12/1992 | Yoshida | 358/406 |
| 5,208,681 | 5/1993 | Yoshida | 358/434 |
| 5,220,439 | 6/1993 | Yoshida | 358/404 |
| 5,303,066 | 4/1994 | Kawaguchi | 358/434 |
| 5,307,179 | 4/1994 | Yoshida | 358/440 |
| 5,351,134 | 9/1994 | Yaguchi et al. | 358/412 |
| 5,438,427 | 8/1995 | Yoshida | 358/405 |
| 5,481,562 | 1/1996 | Pearson et al. | 375/222 |
| 5,491,565 | 2/1996 | Naper | 358/435 |
| 5,508,820 | 4/1996 | Kabeya | 358/412 |
| 5,513,213 | 4/1996 | Patel et al. | 375/222 |
| 5,524,122 | 6/1996 | Lepitre et al. | 375/222 |
| 5,541,955 | 7/1996 | Jacobsmeyer | 375/222 |
| 5,550,881 | 8/1996 | Sridhar et al. | 375/222 |
| 5,577,087 | 11/1996 | Furuya | 375/222 |
| 5,586,151 | 12/1996 | Minigawa | 375/222 |
| 5,649,299 | 7/1997 | Battin et al. | 375/222 |
| 5,687,222 | 11/1997 | McLaughlin et al. | 375/222 |

*Primary Examiner*—Edward L. Coles
*Assistant Examiner*—Cheukfan Lee
*Attorney, Agent, or Firm*—Fitzpatrick, Cella, Harper & Scinto

[57] ABSTRACT

A data communication apparatus can conduct data communication by selecting an appropriate transmission rate in accordance with states of transmitting and receiving apparatus and a line condition.

A transmission rate executable in accordance with an execution state of the process and transmission rates possessed by its own modem are informed to a destination apparatus, and transmission rates possessed by the destination apparatus and an executable transmission rate are received through the modem, and a quality of a line is also detected to determine the transmission rate. The transmission rate is changed in accordance with a change of execution state of the process during the communication.

16 Claims, 13 Drawing Sheets

FIG. 2

RIS

| | |
|---|---|
| BIT X | ABILITY TO RECEIVE AT 28.8kb/s : PRESENT/ABSENT=1/0 |
| BIT X+1 | ABILITY TO RECEIVE AT 26.4kb/s : PRESENT/ABSENT=1/0 |
| BIT X+2 | ABILITY TO RECEIVE AT 24.0kb/s : PRESENT/ABSENT=1/0 |
| BIT X+3 | ABILITY TO RECEIVE AT 21.6kb/s : PRESENT/ABSENT=1/0 |
| BIT X+4 | ABILITY TO RECEIVE AT 19.2kb/s : PRESENT/ABSENT=1/0 |
| BIT X+5 | ABILITY TO RECEIVE AT 16.8kb/s : PRESENT/ABSENT=1/0 |
| BIT X+6 | ABILITY TO RECEIVE AT 14.4kb/s : PRESENT/ABSENT=1/0 |
| BIT X+7 | ABILITY TO RECEIVE AT 12.0kb/s : PRESENT/ABSENT=1/0 |
| BIT X+8 | ABILITY TO RECEIVE AT 9.6kb/s : PRESENT/ABSENT=1/0 |
| BIT X+9 | ABILITY TO RECEIVE AT 7.2kb/s : PRESENT/ABSENT=1/0 |
| BIT X+10 | ABILITY TO RECEIVE AT 4.8kb/s : PRESENT/ABSENT=1/0 |
| BIT X+11 | ABILITY TO RECEIVE AT 2.4kb/s : PRESENT/ABSENT=1/0 |
| BIT X+12 | RECEIVABLE AT 28.8kb/s : YES/NO=1/0 |
| BIT X+13 | RECEIVABLE AT 26.4kb/s : YES/NO=1/0 |
| BIT X+14 | RECEIVABLE AT 24.0kb/s : YES/NO=1/0 |
| BIT X+15 | RECEIVABLE AT 21.6kb/s : YES/NO=1/0 |
| BIT X+16 | RECEIVABLE AT 19.2kb/s : YES/NO=1/0 |
| BIT X+17 | RECEIVABLE AT 16.8kb/s : YES/NO=1/0 |
| BIT X+18 | RECEIVABLE AT 14.4kb/s : YES/NO=1/0 |
| BIT X+19 | RECEIVABLE AT 12.0kb/s : YES/NO=1/0 |
| BIT X+20 | RECEIVABLE AT 9.6kb/s : YES/NO=1/0 |
| BIT X+21 | RECEIVABLE AT 7.2kb/s : YES/NO=1/0 |
| BIT X+22 | RECEIVABLE AT 4.8kb/s : YES/NO=1/0 |
| BIT X+23 | RECEIVABLE AT 2.4kb/s : YES/NO=1/0 |

FIG. 3

RIS

BIT X+24 RECEIVABLE AT 28.8kb/s ACCORDING TO LINE CONDITION
: YES/NO=1/0

BIT X+25 RECEIVABLE AT 26.4kb/s ACCORDING TO LINE CONDITION
: YES/NO=1/0

BIT X+26 RECEIVABLE AT 24.0kb/s ACCORDING TO LINE CONDITION
: YES/NO=1/0

BIT X+27 RECEIVABLE AT 21.6kb/s ACCORDING TO LINE CONDITION
: YES/NO=1/0

BIT X+28 RECEIVABLE AT 19.2kb/s ACCORDING TO LINE CONDITION
: YES/NO=1/0

BIT X+29 RECEIVABLE AT 16.8kb/s ACCORDING TO LINE CONDITION
: YES/NO=1/0

BIT X+30 RECEIVABLE AT 14.4kb/s ACCORDING TO LINE CONDITION
: YES/NO=1/0

BIT X+31 RECEIVABLE AT 12.0kb/s ACCORDING TO LINE CONDITION
: YES/NO=1/0

BIT X+32 RECEIVABLE AT 9.6kb/s ACCORDING TO LINE CONDITION
: YES/NO=1/0

BIT X+33 RECEIVABLE AT 7.2kb/s ACCORDING TO LINE CONDITION
: YES/NO=1/0

BIT X+34 RECEIVABLE AT 4.8kb/s ACCORDING TO LINE CONDITION
: YES/NO=1/0

BIT X+35 RECEIVABLE AT 2.4kb/s ACCORDING TO LINE CONDITION
: YES/NO=1/0

FIG. 4

TIS

| | |
|---|---|
| BIT X | ABILITY TO SEND AT 28.8kb/s : PRESENT/ABSENT=1/0 |
| BIT X+1 | ABILITY TO SEND AT 26.4kb/s : PRESENT/ABSENT=1/0 |
| BIT X+2 | ABILITY TO SEND AT 24.0kb/s : PRESENT/ABSENT=1/0 |
| BIT X+3 | ABILITY TO SEND AT 21.6kb/s : PRESENT/ABSENT=1/0 |
| BIT X+4 | ABILITY TO SEND AT 19.2kb/s : PRESENT/ABSENT=1/0 |
| BIT X+5 | ABILITY TO SEND AT 16.8kb/s : PRESENT/ABSENT=1/0 |
| BIT X+6 | ABILITY TO SEND AT 14.4kb/s : PRESENT/ABSENT=1/0 |
| BIT X+7 | ABILITY TO SEND AT 12.0kb/s : PRESENT/ABSENT=1/0 |
| BIT X+8 | ABILITY TO SEND AT 9.6kb/s : PRESENT/ABSENT=1/0 |
| BIT X+9 | ABILITY TO SEND AT 7.2kb/s : PRESENT/ABSENT=1/0 |
| BIT X+10 | ABILITY TO SEND AT 4.8kb/s : PRESENT/ABSENT=1/0 |
| BIT X+11 | ABILITY TO SEND AT 2.4kb/s : PRESENT/ABSENT=1/0 |
| BIT X+12 | SENDABLE AT 28.8kb/s : YES/NO=1/0 |
| BIT X+13 | SENDABLE AT 26.4kb/s : YES/NO=1/0 |
| BIT X+14 | SENDABLE AT 24.0kb/s : YES/NO=1/0 |
| BIT X+15 | SENDABLE AT 21.6kb/s : YES/NO=1/0 |
| BIT X+16 | SENDABLE AT 19.2kb/s : YES/NO=1/0 |
| BIT X+17 | SENDABLE AT 16.8kb/s : YES/NO=1/0 |
| BIT X+18 | SENDABLE AT 14.4kb/s : YES/NO=1/0 |
| BIT X+19 | SENDABLE AT 12.0kb/s : YES/NO=1/0 |
| BIT X+20 | SENDABLE AT 9.6kb/s : YES/NO=1/0 |
| BIT X+21 | SENDABLE AT 7.2kb/s : YES/NO=1/0 |
| BIT X+22 | SENDABLE AT 4.8kb/s : YES/NO=1/0 |
| BIT X+23 | SENDABLE AT 2.4kb/s : YES/NO=1/0 |

FIG. 5

TIS

| | |
|---|---|
| BIT X+24 | DETERMINE 28.8kb/s ACCORDING TO LINE CONDITION AND FACULTIES OF SENDER/RECEIVER : YES/NO=1/0 |
| BIT X+25 | DETERMINE 26.4kb/s ACCORDING TO LINE CONDITION AND FACULTIES OF SENDER/RECEIVER : YES/NO=1/0 |
| BIT X+26 | DETERMINE 24.0kb/s ACCORDING TO LINE CONDITION AND FACULTIES OF SENDER/RECEIVER : YES/NO=1/0 |
| BIT X+27 | DETERMINE 21.6kb/s ACCORDING TO LINE CONDITION AND FACULTIES OF SENDER/RECEIVER : YES/NO=1/0 |
| BIT X+28 | DETERMINE 19.2kb/s ACCORDING TO LINE CONDITION AND FACULTIES OF SENDER/RECEIVER : YES/NO=1/0 |
| BIT X+29 | DETERMINE 16.8kb/s ACCORDING TO LINE CONDITION AND FACULTIES OF SENDER/RECEIVER : YES/NO=1/0 |
| BIT X+30 | DETERMINE 14.4kb/s ACCORDING TO LINE CONDITION AND FACULTIES OF SENDER/RECEIVER : YES/NO=1/0 |
| BIT X+31 | DETERMINE 12.0kb/s ACCORDING TO LINE CONDITION AND FACULTIES OF SENDER/RECEIVER : YES/NO=1/0 |
| BIT X+32 | DETERMINE 9.6kb/s ACCORDING TO LINE CONDITION AND FACULTIES OF SENDER/RECEIVER : YES/NO=1/0 |
| BIT X+33 | DETERMINE 7.2kb/s ACCORDING TO LINE CONDITION AND FACULTIES OF SENDER/RECEIVER : YES/NO=1/0 |
| BIT X+34 | DETERMINE 4.8kb/s ACCORDING TO LINE CONDITION AND FACULTIES OF SENDER/RECEIVER : YES/NO=1/0 |
| BIT X+35 | DETERMINE 2.4kb/s ACCORDING TO LINE CONDITION AND FACULTIES OF SENDER/RECEIVER : YES/NO=1/0 |

FIG. 7

| | | | |
|---|---|---|---|
| a | RIS | X to X+23 | →1 |
| | | X+24 to X+35 | →0 |
| b | TIS | X to X+23 | →1 |
| | | X+24 to X+35 | →0 |
| c | RIS | X to X+35 | →1 |
| d | TIS | X to X+23 | →1 |
| | | X+24 | →1 |
| | | X+25 to X+35 | →0 |

} 28.8kb/s DESIGNATED

| | | | |
|---|---|---|---|
| e | TIS | X to X+11 | →1 |
| | | X+12, X+13 | →0 |
| | | X+14 to X+23 | →1 |
| | | X+24 to X+35 | →0 |
| f | RIS | X to X+35 | →1 |
| g | TIS | X to X+11 | →1 |
| | | X+12, X+13 | →0 |
| | | X+14 to X+23 | →1 |
| | | X+24, X+25 | →0 |
| | | X+26 | →1 |
| | | X+27 to X+35 | →0 |

} 24.0kb/s DESIGNATED

DATA COMMUNICATION APPARATUS FOR SETTING DATA TRANSMISSION RATE IN ACCORDANCE WITH COMMUNICATION PROCESSING ABILITY

This application is a continuation of application Ser. No. 08/504,416 filed Jul. 20, 1995.

BACKGROUND OF THE INVENTION

1. Field of the Invention

The present invention relates to a data communication apparatus for setting a data transmission rate in accordance with a communication processing ability.

2. Related Background Art

An apparatus of this type has been known as a facsimile apparatus, for example.

In a prior art facsimile apparatus, when a receiving facsimile apparatus has a modem of V.29 and V.27 ter (9600 bps, 7200 bps, 4800 bps and 2400 bps), a transmission rate ability of the modem is informed by a protocol signal to a transmitting facsimile apparatus. The transmitting facsimile apparatus selects from the received transmission rate ability of the receiving apparatus a highest transmission rate which is compatible to its own modem and informs the selected transmission rate to the receiving apparatus and sends a training check signal (TCF) for checking whether an image signal can be transmitted at the selected transmission rate. If the receiving apparatus correctly receives the TCF signal at the selected transmission rate, it informs to the transmitting apparatus the normal reception of the TCF signal. Subsequently, the image is communicated at the selected transmission rate. On the other hand, if the receiving apparatus does not correctly receive the TCF signal at the selected transmission rate, it informs to the transmitting apparatus that the TCF signal was not received correctly. The transmission apparatus sets the transmission rate one step lower and retransmits the TCF signal. In this manner, the transmission rate is lowered stepwise until the TCF signal is correctly received by the receiving apparatus, and after the TCF signal is correctly received, the image is communicated at that transmission rate. In this manner, in the prior art facsimile apparatus, a transmission rate is determined in accordance with a quality of the line.

A facsimile apparatus which receives image information from an external information terminal such as a computer and sends the received image information to another facsimile apparatus has been known. In such a facsimile apparatus, a transmission rate which does not cause underflow or overflow by a receiving rate of the image information from the external information terminal, a quality of the line and a function of a destination facsimile apparatus is selected. The selected transmission rate is thereafter changed in accordance with the quality of the line. In such a facsimile apparatus, the receiving rate of the image rate from the external information terminal is determined by the data communication function between the external information terminal and the facsimile apparatus. The facsimile apparatus sets the transmission rate to the destination facsimile apparatus such that it is lower than the receiving rate from the external information terminal. Accordingly, once the receiving rate from the external information terminal is set to a low transmission rate, the communication can be conducted only at the low transmission rate even if the communication at a higher transmission rate is permitted between both facsimile apparatuses.

In the above instance, if the function of the external information terminal has only the low transmission rate, it is natural that the transmission rate between both facsimile apparatuses is low.

However, a certain external information terminal (computer) may conduct the data transmission and the data processing concurrently by the multitasking in which one CPU (microcomputer) parallelly executes a plurality of types of processing. In this case, the processing speed for the data transmission changes between when the computer is dedicated to the data transmission and when it parallelly executes the data transmission and data processing. Thus, when it is dedicated to the data transmission, the data transmission at a high transmission rate is permitted while when it transmits the data by the multitasking, only the data transmission at a low transmission rate is permitted.

When the image information is to be transmitted from the external information terminal to another facsimile apparatus through the facsimile apparatus, the low transmission rate is set if the external information terminal is processing the multitask at the start of the transmission. Even if the multitask processing is over during the transmission and the external information terminal may be dedicated to the data transmission and the high transmission rate is permitted, the image communication is conducted at the low transmission rate once it is set.

This is not only a problem where the image information of the external information terminal is transmitted to another facsimile apparatus through the facsimile apparatus but also a problem in a facsimile apparatus having a complex function of executing a local operation (such as a copy operation) and the facsimile communication by one CPU.

SUMMARY OF THE INVENTION

It is an object of the present invention to improve a data communication apparatus in the light of the above problems.

It is another object of the present invention to change a data transmission rate in accordance with a change of a communication processing ability during the communication to permit efficient communication processing.

Other objects of the present invention will be apparent from the following description of the preferred embodiments and the drawings.

BRIEF DESCRIPTION OF THE DRAWINGS

FIG. 2 shows a protocol signal in the embodiment.

FIG. 3 shows a protocol signal in the embodiment.

FIG. 4 shows a protocol signal in the embodiment.

FIG. 5 shows a protocol signal in the embodiment.

FIG. 7 shows a change in bit information of the protocol signal.

DETAILED DESCRIPTION OF THE PREFERRED EMBODIMENTS

An embodiment of the present invention is now explained in detail with reference to the accompanying drawings.

In the following embodiment, a facsimile apparatus is shown as a data communication apparatus.

Figure 1:
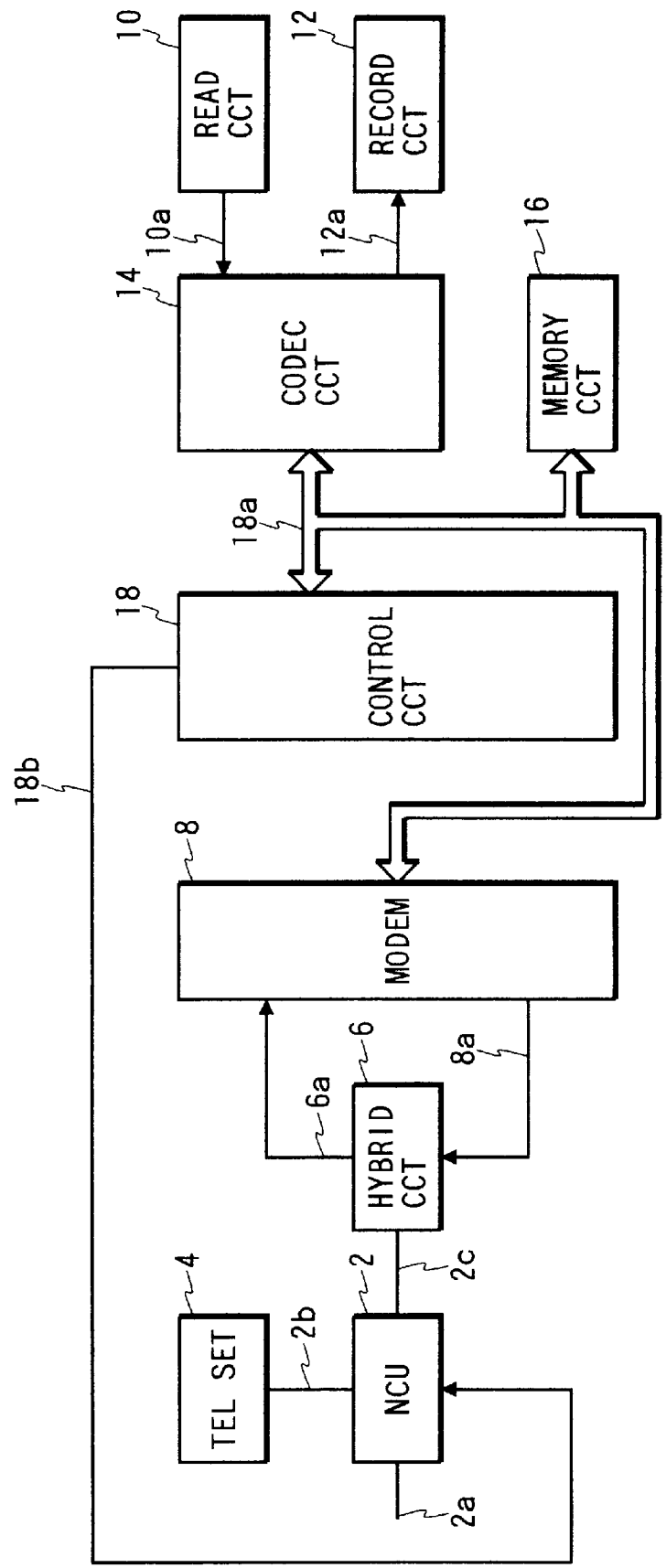
FIG. 1 shows a block diagram of a configuration of a facsimile apparatus in accordance with an embodiment.

FIG. 1 shows a block diagram of a configuration of the facsimile apparatus of the present embodiment.

Numeral 2 denotes an NCU (network control unit) for connecting to a terminal of a line to use a telephone network for data communication, controlling the connection of a telephone switching network, switching to a data communication line and maintaining a loop. When a signal level from a control circuit 18 (signal line 18b) is '0', the NCU 2 connects a telephone line 2a to a telephone set, and when the signal level is '1', it connects the telephone line 2a to the facsimile apparatus. In a normal state, the telephone line 2a is connected to the telephone set 4.

Numeral 4 denotes the telephone set.

Numeral 6 denotes a hybrid circuit which separates a signal of a transmission system and a signal of a receiving system, sends a transmission signal from a modem 8 (signal line 8a) to the telephone line 2a through the NCU 2, receives a signal from other apparatus through the NCU 2 and sends it to the modem 8 through a signal line 6a.

Numeral 8 denotes the modem from modulating and demodulating in accordance with the ITU-T Recommendation V.8, V.21, V.27 ter, V.29, V.17 and V.34. A transmission mode is designated by a signal line 18a. The signal line 18a is data bus through which the data to designate the transmission mode is outputted, the transmission data is received and the received data is outputted. The modem 8 receives the signal outputted to the signal line 18a and outputs the modulated data to the signal line 8a in the transmission mode, while receives the received signal outputted to the signal line 6a and outputs the demodulated data to the signal line 18a in the reception mode.

Numeral 10 denotes a read circuit which outputs a read binary data to a signal line 10a.

Numeral 12 denotes a record circuit which sequentially record, one line at a time, the information outputted to a signal line 12a.

Numeral 14 denotes a coder/decoder (codec) circuit which receives the read data from the signal line 10a, outputs the data coded in a designated coding system (for example, MR coding with K=8) and stores it in a memory circuit 16 by DMA transfer. The coding system is designated by a control circuit 18 through a signal line 18a. It also transfers the data coded in a predetermined coding system (for example, MR coding with K=8) stored in a memory 16 to the signal line 18a by the DMA transfer, decodes it and outputs the decoded data to the signal line 12a.

Numeral 16 denotes the memory which stores the read information MR coded with K=8. It also decodes the information, recodes it into information of a record size of a receiving apparatus and in a coded mode receivable by the receiving apparatus, and stores the information. It is also used to store the received information, decodes the received information, converts it to the information MR coded with K=8 and stores it. The information to be stored in the memory and the data outputted from the memory are through the signal line 18a. When the control circuit 18 parallelly executes by the multitasking process a local operation such as a copy operation or a store operation of the read image to the memory and a communication process such as transmission or reception of the image from or to the memory, the information quantity passing through the data bus increases and the communication processing at the high transmission rate is disabled. Thus, during the parallel processing, it is necessary to reduce the transmission rate. The control circuit 18 comprises a microprocessor, a ROM and a RAM and the plurality of processes are parallelly executed by the multitask processing (dual processing).

Figure 6:
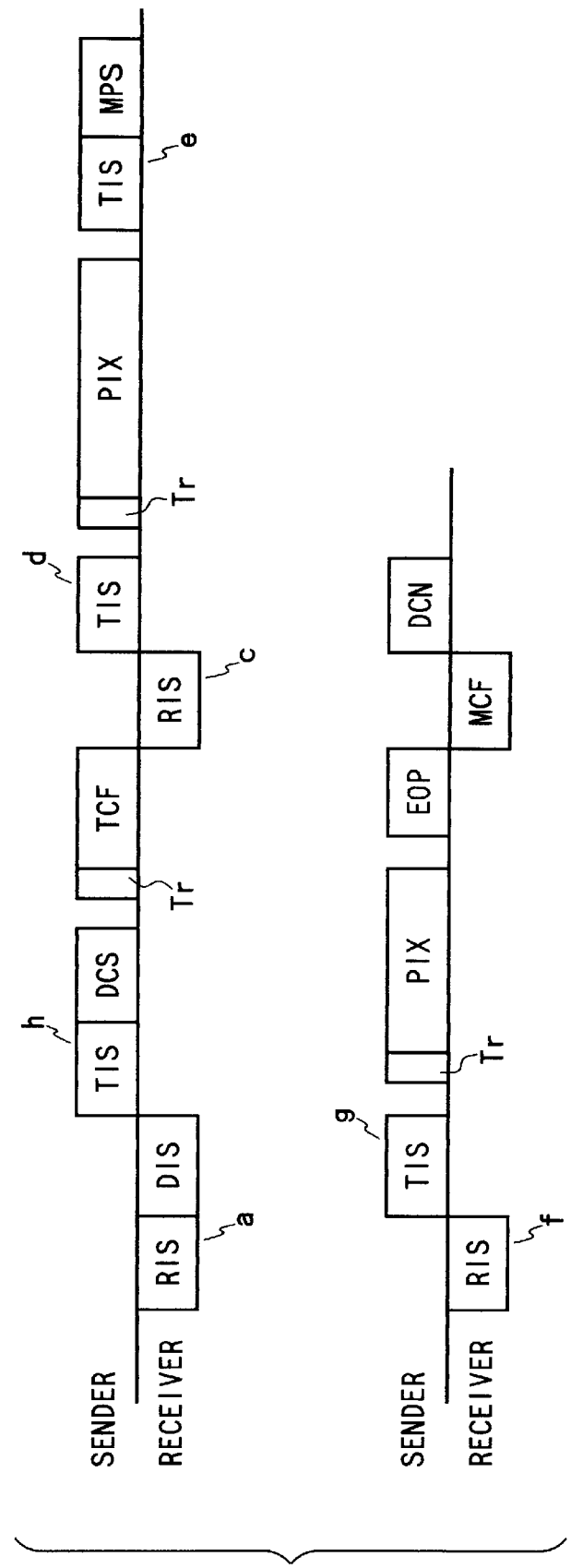
FIG. 6 shows a communication sequence in the embodiment.

In the present embodiment, the receiving apparatus informs to the transmitting apparatus the presence or absence of receiving ability for the respective transmission rates, permissibility of the receiving process and permissibility of reception based on the detection of the line condition, and the transmitting apparatus informs to the receiving apparatus the presence or absence of a transmission ability for the respective transmission rates and permissibility of the transmission process as well as a transmission rate determined by the line condition and the processing abilities of the receiving and transmitting apparatuses so that the transmission rate may be determined for each page. Specifically, an example of a protocol in the present embodiment is explained with reference to FIG. 6. In FIG. 6, a RIS (receiving identification signal) is first sent from the receiving apparatus to the transmitting apparatus.

A specific example of the RIS signal is shown in FIGS. 2 and 3.

In FIGS. 2 and 3, a bit x of the RIS signal represents the presence or absence of the 28.8 Kb/s receiving ability. If it is present, the bit x is set to '1' and, if not, it is set to '0'. Bits x+1, x+2, x+3, x+4, x+5, x+6, x+7, x+8, x+9, x+10 and x+11 represent the presence or absence of the abilities to receive at 26.4, 24.0, 21.6, 19.2, 16.8, 14.4, 12.0, 9.6, 7.2, 4.8 and 2.4 Kb/s, respectively. If it is present, '1' is set and if not, '0' is set. They represent the receivable transmission rates when the amount of processes other than the receiving process is small.

A bit x+12 of the RIS signal indicates whether the reception at 28.8 Kb/s is currently permitted or not. If it is, '1' is set and if not, '0' is set. Bits x+13, x+14, x+15, x+16, x+17, x+18, x+19, x+20, x+21, x+22 and x+23 indicate whether the reception at 26.4, 24.0, 21.6, 19.2, 16.8, 14.4, 12.0, 9.6, 7.2, 4.8 and 2.4 Kb/s, respectively are permitted or not. If it is, '1' is set and if not, '0' is set. They represent the transmission rates receivable and currently processable.

A bit x+24 of the RIS signal judges the line condition to determine whether the reception at 28.8 Kb/s is permitted or not. If it is, '1' is set and if not, '0' is set. Bits x+25, x+26, x+27, x+28, x+29, x+30, x+31, x+32, x+33, x+34 and x+35 judges the line condition to determine whether the reception at 26.4, 24.0, 21.6, 19.2, 16.8, 14.4, 12.0, 9.6, 7.2, 4.8 and 2.4 Kb/s, respectively are permitted or not. If it is, '1' is set and if not, '0' is set.

In the initial RIS signal, it is now assumed that the bits x to x+23 are valid and the bits x+24 to x+35 are '0'. The receiving apparatus subsequently transmits a DIS signal and transmits the RIS signal after the reception of TIS and DCS signals and Tr-TCF signal from the transmitting apparatus. Since the line condition is checked by the training TCF (training check) signal, all of the bits x to x+35 of the RIS signal are valid. Then, it transmits the RIS signal after the reception of the TIS, Tr-PIX, TIS and MPS signals. Since the line condition can be determined by the reception condition of the previous page, the bits x to x+35 of the RIS signal are all valid.

The TIS (transmitting identification signal) is now explained. The transmitting apparatus recognizes the information of the receiving ability of the receiving apparatus for the respective transmission rates, the information on whether the receiving apparatus can currently receive or not, and the determination of the line condition. It also receives the DIS signal to recognize other abilities of the receiving apparatus. The transmitting apparatus then transmits the TIS signal.

A specific example of the TIS signal is shown in FIGS. 4 and 5.

In FIGS. 4 and 5, the bit x of the TIS signal represents the presence or absence of the transmitting ability at 28.8 Kb/s. If it is present, '1' is set and if not, '0' is set. Bits x+1, x+2, x+3, x+4, x+5, x+6, x+7, x+8, x+9, x+10 and x+11 represent the presence or absence of the abilities to transmit at 26.4, 24.0, 21.6, 19.2, 16.8, 14.4, 12.0, 9.6, 7.2, 4.8 and 2.4 Kb/s, respectively. If it is present, '1' is set and if not, '0' is set. They represent the transmittable transmission rates when the amount of processes other than the transmitting process is small.

A bit x+12 of the TIS signal indicates whether the transmission at 28.8 Kb/s is currently permitted or not. If it is, '1' is set and if not, '0' is set. Bits x+13, x+14, x+15, x+16, x+17, x+18, x+19, x+20, x+21, x+22 and x+23 indicate whether the transmission at 26.4, 24.0, 21.6, 19.2, 16.8, 14.4, 12.0, 9.6, 7.2, 4.8 and 2.4 Kb/s, respectively are permitted or not. If it is, '1' is set and if not, '0' is set. They represent the transmission rates receivable and currently processable.

A bit x+24 of the TIS signal designates the transmission rate for the transmission based on the currently processable ability of the transmitting apparatus (the information of the bits x+12 to x+23 of the RIS signal and the bits x+12 to x+24 of the TIS signal) and the determination of the line condition (the information on the bits x+24 to x+35 of the RIS signal). When the transmission is to be made at 28.8 Kb/s, only the bit x+24 of the TIS signal is set to '1' and the bits x+25, x+26, x+27, x+28, x+29, x+30, x+31, x+32, x+33, x+34 and x+35 are set to '0'. When the transmission is to be made at 26.4, 24.0, 21.6, 19.2, 16.8, 14.4, 12.0, 9.6, 7.2, 4.8 and 2.4 Kb/s, bits x+25, x+26, x+27, x+28, x+29, x+30, x+31, x+32, x+33, x+34 and x+35 are set to '1', respectively and other bits are set to '0'.

It is now assumed that the bits x to x+23 of the first TIS signal transmitted by the transmitting apparatus at the reception of the RIS and DIS signals are valid, and that since the bits x+24 to x+35 are '0' since the determination of the line condition is not completed. The bits x to x+35 of the TIS signal which is immediately before the image signal transmitted after the transmission of the TIS, DCS and Tr-TCF signals and the reception of the RIS signal are all valid. The bits x to x+23 of the TIS signal transmitted after the Tr-PIX signal are valid (the bits x+24 to x+35 are '0') and the bits x to x+35 of the TIS signal transmitted immediately before the image signal after the reception of the RIS signal for the transmission of the MPS signal are valid.

For example, it is assumed that a copy operation is selected during the memory transmission. During the transmission of the first page, the copy operation is not required and the transmission processing ability of 28.8 Kb/s is permitted. In the course of the transmission of the first page, the copy operation is selected and the transmitting ability is lowered so that the second page is transmitted at 24.0 Kb/s. A specific examples of bits of the RIS and TIS signals are shown in FIG. 7. In FIG. 6, the TIS and RIS signals are represented by a, b, c, d, e, f and g in sequence.

In FIG. 7, since the RIS signal a can be received and processed at any transmission rate from 2.4 Kb/s to 28.8 Kb/s, the bits x to x+23 bits are all set to '1' and the bits x+24 to x+25 are all set to '0' since the determination of the transmission rate based on the line condition is not made.

Since the TIS signal b can be transmitted and processed at any transmission rate from 2.4 Kb/s to 28.8 Kb/s, the bits x to x+23 are all set to '1' and the bits x+24 to x+35 are all set to '0' since the determination of the transmission rate based on the line condition and the processing abilities of the transmitting and receiving apparatuses is not determined.

Since the transmission rate by the line condition is determined for the RIS signal a and it is determined that the transmission rate of up to 28.8 Kb/s is permitted, the bits x to x+35 of the RIS signal c are all set to '1'.

Since the transmission rate is determined as 28.8 Kb/s by the processing ability of the line condition and the processing abilities of the transmitting and receiving apparatuses for the TIS signal b, the bits x+24 of the TIS signal d is set to '1' and the bits x+25 to x+35 are set to '0' and the transmission rate of 28.8 Kb/s is designated to the receiving apparatus.

Since the copy operation is selected during the memory transmission of the first page and the transmission rate permitted for the transmission processing for the TIS signal d is lower than 24.0 Kb/s, the bits x+12 and x+13 of the TIS signal e are set to '0'. Since the determination of the transmission rate based on the line condition and the processing abilities of the transmitting and receiving apparatuses is made, the bits x+24 to x+35 are set to '0'.

Since the state in the receiving apparatus does not change, the RIS signal f which is identical to the RIS signal c is transmitted.

Since the transmission rate of the TIS signal d is determined to 24.0 Kb/s by the line condition and the processing abilities of the transmitting and receiving apparatuses, the bits x+24, x+25 and x+27 to x+35 of the TIS signal g are set to '0' and the bit x+26 is set to '1' to designate the transmission rate of 24.0 Kb/s to the receiving apparatus.

As a dual process in the present embodiment.

(1) the copy operation during the memory transmission, (2) memory transmission during the copy operation, (3) the storing of transmission information under reception or recording, into the memory, (4) the reception and recording of the transmission information during the memory storing, (5) the copy operation during the memory reception, and (6) the memory reception during the copy operation are considered.

In a flow of the memory transmission, the information read by the read circuit 10 is MR-coded with K=8 by the codec circuit and it is stored in the memory 16 through the data bus (signal line 18a). After all transmission information are stored in the memory 16, a call is made, and after the connection of the call, the information stored in the memory 16 is received through the control circuit 18 or the data bus (signal line 18a). It is recorded in accordance with the coding ability of the destination receiving apparatus and outputted to the modem 8 through the data bus. The transmission of the MR coded data with K=8 stored in the memory 16 is referred to as the memory transmission.

In a flow of the memory reception, the received information is demodulated by the modem 8 and the demodulated data is stored in the memory 16 through the data bus. The control circuit 18 MR codes it with K=8 through the data bus 2 and stores it in the memory.

In a flow of the copy operation, the read information from the read circuit 10 is inputted to the codec circuit 14 and the MR coded data with K=8 is stored in the memory circuit 16. When one page of read data is stored in the memory 16, the MR coded data with K=8 from the memory 16 is inputted to the codec circuit 14 through the data bus and outputted to the signal line 12a for recording.

In this manner, the multitask processing (dual operation) is conducted so that the frequency of use of the data bus is increased and a throughput of one operation is decreased.

A specific example of the control circuit 18 is shown in FIGS. 8 to 12. The memory transmission is executed at 28.8 Kb/s and when the copy operation is selected during the memory transmission, the memory transmission is executed at 24.0 Kb/s, and when the copy operation is completed, the memory transmission is executed at 28.8 Kb/s.

Figure 8:
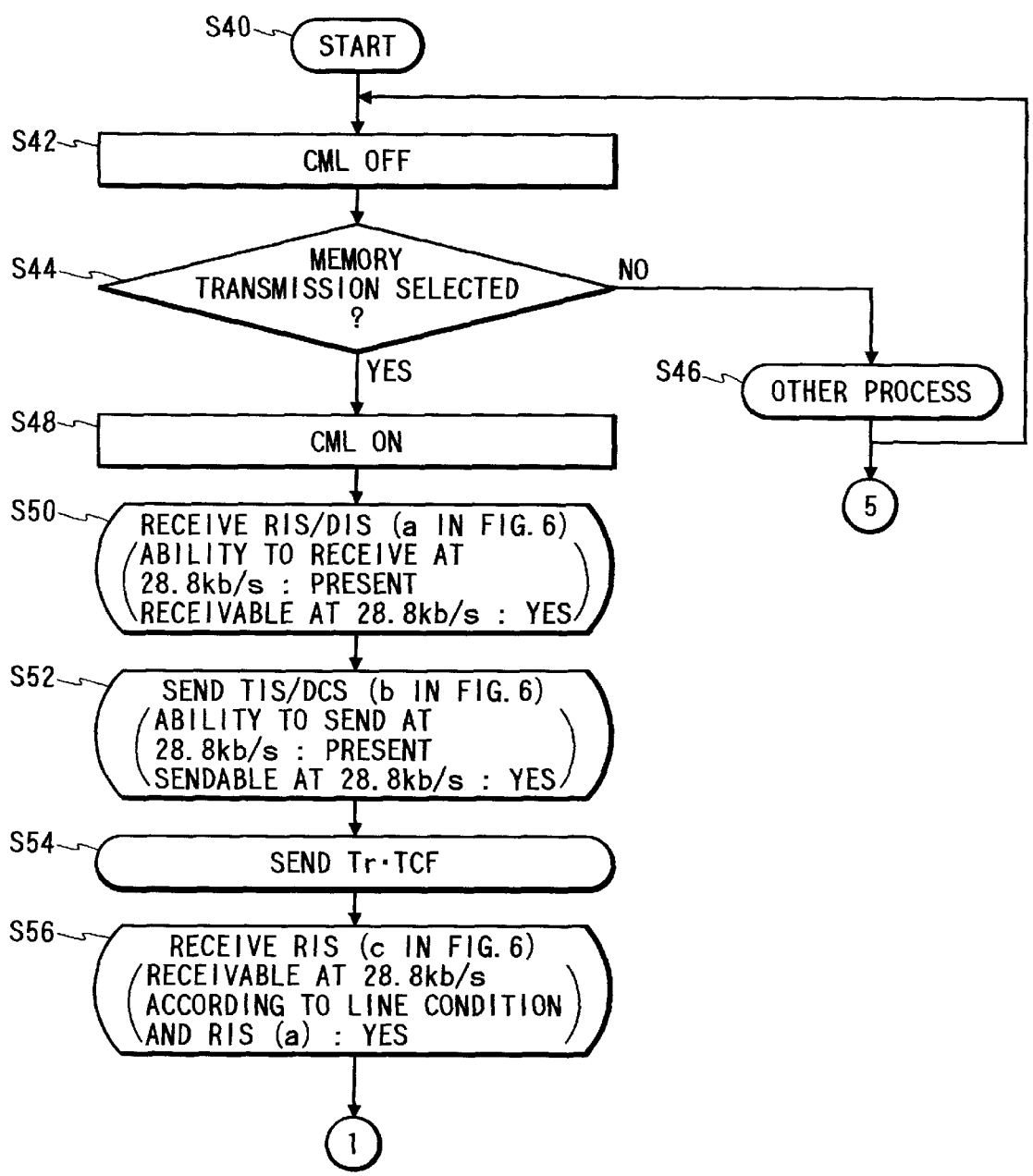
FIG. 8 shows a flow chart of a control operation of the embodiment.
Figure 9:
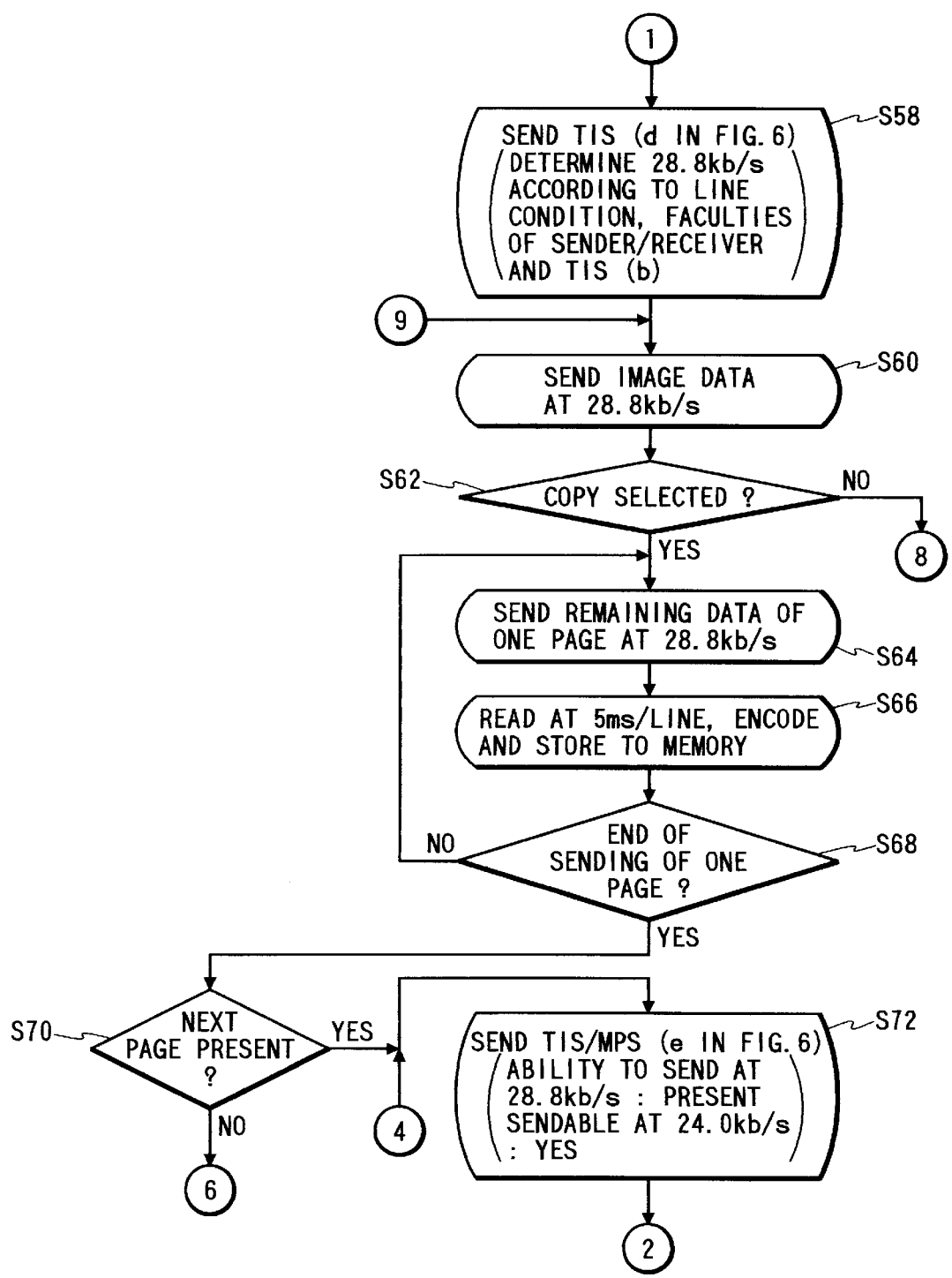
FIG. 9 shows a flow chart of a control operation of the embodiment.
Figure 10:
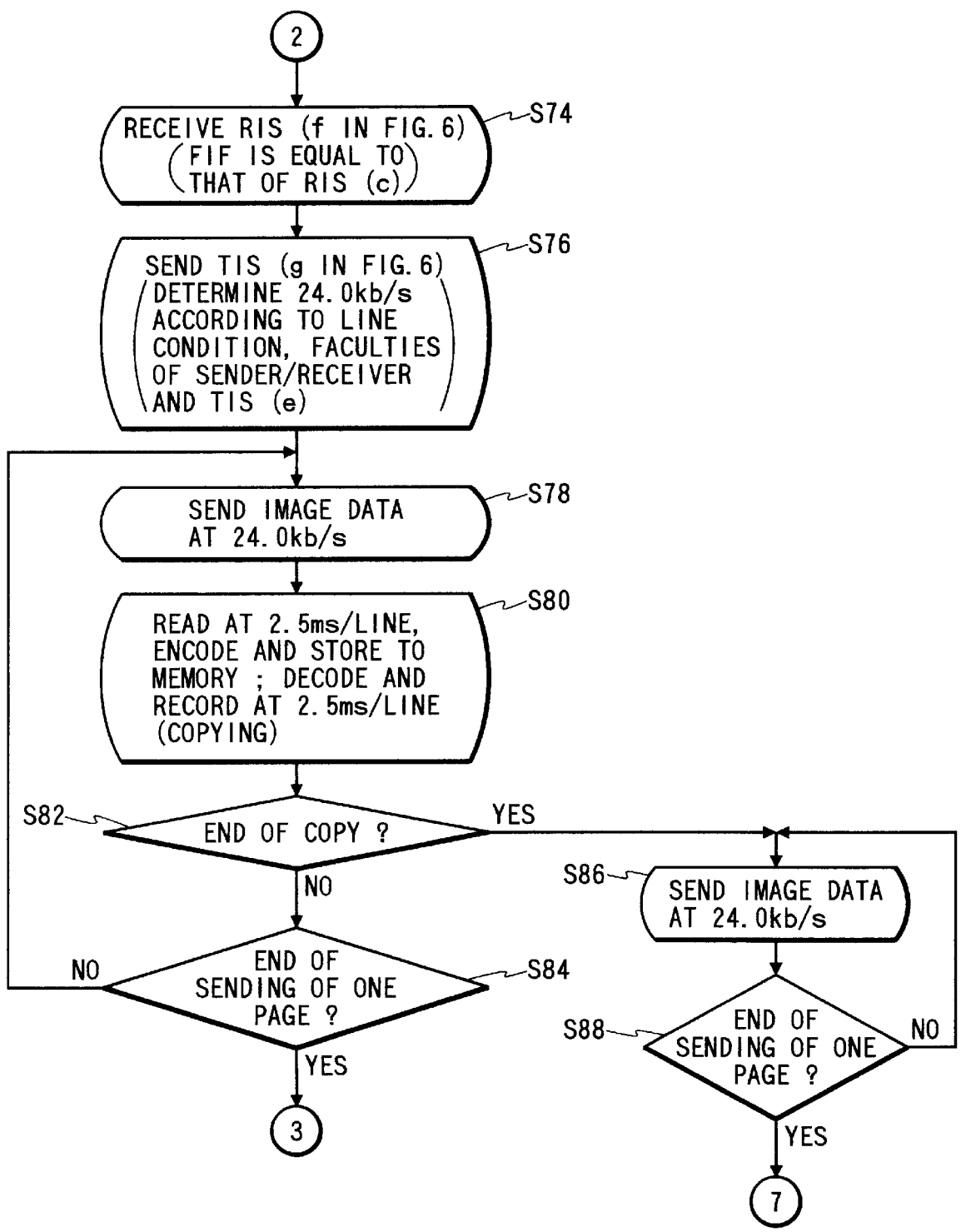
FIG. 10 shows a flow chart of a control operation of the embodiment.
Figure 11A:
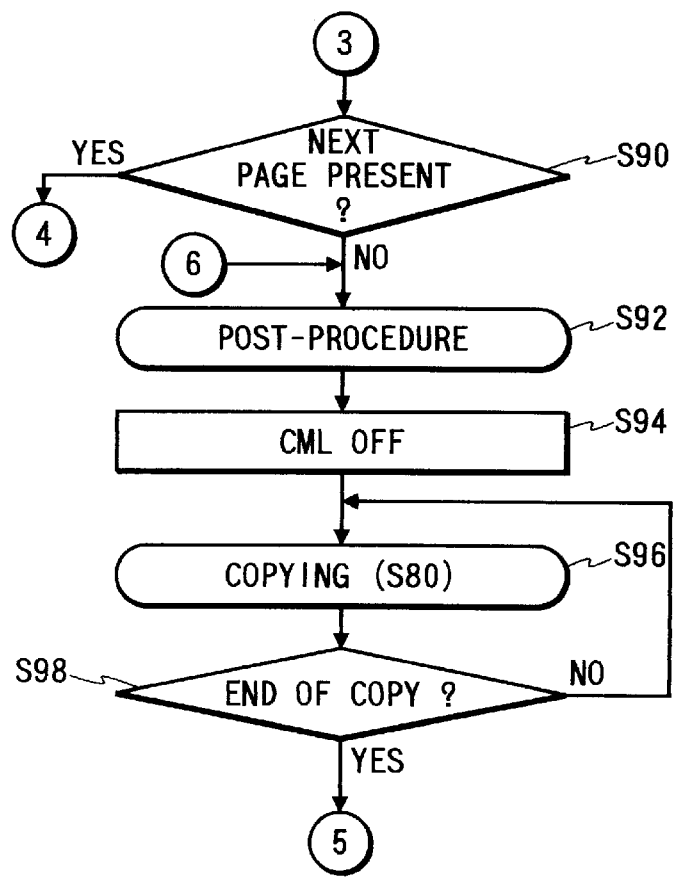
FIGS. 11A and 11B show flow charts of a control operation of the embodiment.
Figure 11B:
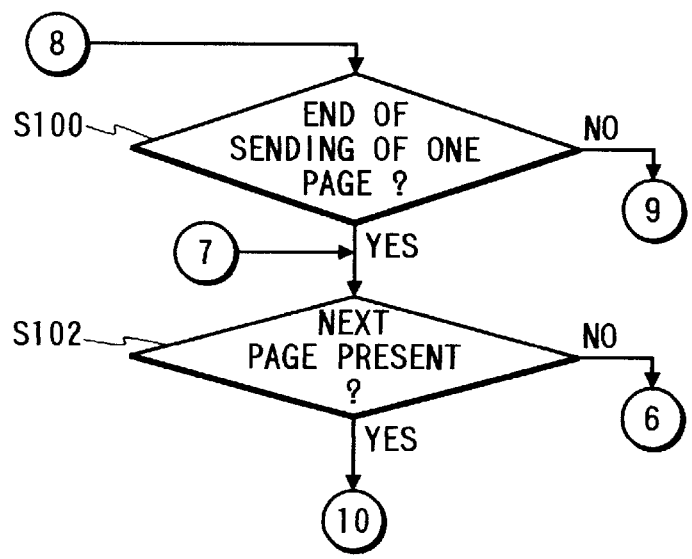
Figure 12:
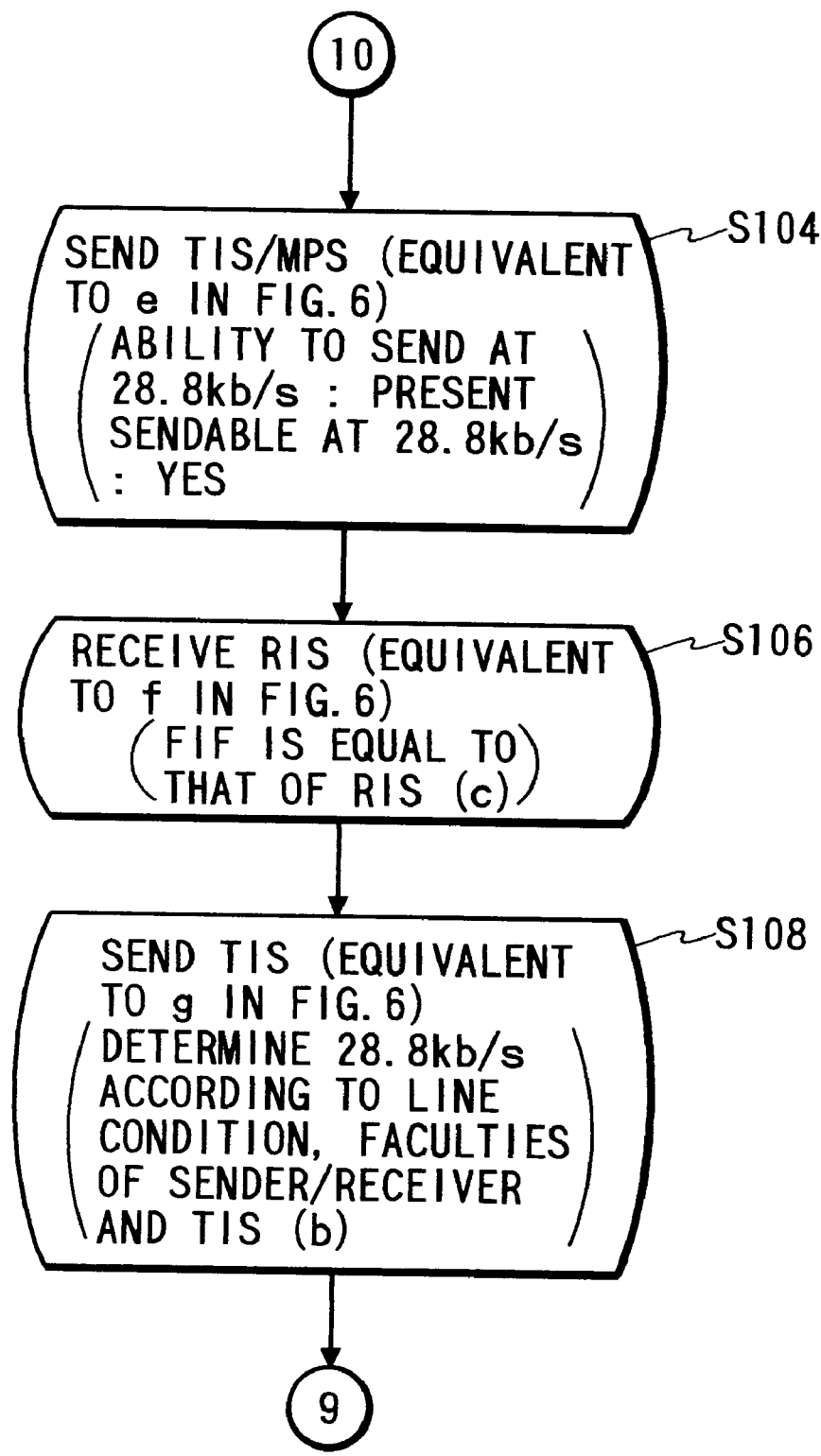
FIG. 12 shows a flow chart of a control operation of the embodiment.

In FIG. 8, S40 indicates the start.

In S42, a signal level '0' is outputted to the signal line 18b to turn off the CML.

In S44, whether memory transmission is selected or not is determined, and if the memory transmission is selected, the process proceeds to S48, and if it is not selected, the process proceeds to S46 to execute other process.

In S48, a signal level '1' is outputted to the signal line 18b to turn on the CML.

In S50, the RIS/DIS signal is received (a in FIG. 6). It is now assumed that the bits x to x+23 of the FIF of the received RIS signal are '1', that is, the receiving ability of 28.8 Kb/s is provided and the processing at 28.8 Kb/s is permitted, and that the bits x+24 to x+35 of the FIF of the received RIS signal are '0'.

In S52, the TIS/DCS signals transmitted (b in FIG. 6). It is assumed that the bits x to x+23 of the FIF of the TIS signal to be transmitted are '1', that is, the transmitting ability of 28.8 Kb/s is provided and the processing at 28.8 Kb/s is permitted, and that the bits x+24 to x+35 of the FIF of the TIS signal to be transmitted are '0'.

In S54, the training signal (Tr) and the TCF (training check) signal are transmitted.

In S56, the RIS signals is received (c in FIG. 6). The bits x to x+35 of the FIF of the received RIS signal are '1' for example, and they are added to the RIS signal (a in FIG. 6) and the ability of reception at 28.8 Kb/s is recognized by the determination of the line condition.

In S60, the image signal is transmitted at 28.8 Kb/s. The control circuit reads the information stored in the memory 16 through the data bus (signal line 18a), recodes it as required and transmits it.

In S62, whether the copy operation is selected as the dual operation during the memory transmission or not is determined. If the copy operation is selected, the process proceeds to S64, and if the copy operation is not selected, the process proceeds to S100.

In S64, the remaining information of the page information being transmitted is transmitted. The information stored in the memory 16 is read through the data bus (signal line 18a), recorded as required and transmitted.

In S66, since the data bus (signal line 18a) is used in the memory transmission operation, the read time for one line is set to 5 ms and information is read, coded and stored in the memory through the signal line 18a (data bus).

In S68, whether the transmission of one page is completed or not is determined. If it is completed, the process proceeds to S70, and if it is not completed, the process proceeds to S64.

In S70, whether there is a next page or not is determined. If there is, the process proceeds to S72, and if there is not, the process proceeds to S92.

In S72, the TIS/MPS signal is transmitted (e in FIG. 6). For example, in case the memory transmission and the copy operation are selected, the frequency of use of the data bus (signal line 18a) is high and the transmission at 24.0 Kb/s is not permitted. Thus, the bits x to x+11 of FIF of the TIS signal are set to '1' to declare that the transmission ability at 28.8 Kb/s is provided, and the bits x+12 and x+13 are set to '0' and the bits x+14 to x+23 are set to '1' to declare that the transmission processing at 24.0 Kb/s is permitted. The bits x+24 to x+35 of the FIF are set to '0'.

In S74, the RIS signal is received (f in FIG. 6). The FIF of the RIS signal of f in FIG. 6 is identical to the FIF of the RIS signal of c in FIG. 6.

In S76, the TIS signal is transmitted (f in FIG. 6). The bits x to x+11 of the FIF of the TIS signal are set to '1' to declare that the transmitting ability at 28.8 Kb/s is provided and the bits x+12 and x+13 of the FIF of the TIS signal are set to '0' and the bits x+14 to x+23 are set to '1' to declare that the transmission processing at 24.0 Kb/s is permitted. The bits x+24 and x+25 and the bits x+27 to x+35 of the FIF of the TIS signal are set to '0' and the bit x+26 is set to 1 to designate the transmission at 24.0 Kb/s.

In S78, the image signal is transmitted at 24.0 Kb/s. The information stored in the memory is inputted through the data bus (signal line 18a), recoded as required and transmitted.

In S80, the information is read at 2.5 ms/line, coded and stored in the memory through the data bus (signal line 18a). When one page of coded data is stored in the memory, the information stored in the memory is transmitted to the codec through the data bus (signal line 18a) for decoding and recorded at 2.5 ms/line.

In S82, whether the copy operation is completed or not is determined. If it is completed, the process proceeds to S86, and if it is not completed, the process proceeds to S84.

In S84, whether one page of transmission is completed or not is determined. If it is completed, the process proceeds to S90, and if it is not completed, the process proceeds to S78.

In S86, the image signal is transmitted at 24.0 Kb/s. The information stored in the memory is inputted through the data bus (signal line 18a), recoded as required and transmitted.

In S88, whether one page of transmission is completed or not is determined. If it is not completed, the process proceeds to S86 and if it is completed, the process proceeds to S102.

In S90, whether there is a next page or not is determined. If there is, the process proceeds to S72, and if there is not, the process proceeds to S92.

In S92, a post protocol is executed.

In S94, a signal level '0' is outputted to the signal line 18b to turn off the CML.

In S96, the copy operation is executed as it is in S80.

In S98, whether the copy operation is completed or not is determined. If it is not completed, the process proceeds to S96, and if it is completed, the process proceeds to S42.

In S100, whether one page of transmission is completed or not is determined. If it is completed, the process proceeds to S102, and if it is not completed, the process proceeds to S60.

In S102, whether there is a next page or not is determined. If there is, the process proceeds to S104 and if there is not, the process proceeds to S92.

In S104, the TIS/MPS signal is transmitted (e in FIG. 6). Since the copy operation is completed or the copy operation is not selected, the bits x to x+23 of the FIF of the TIS are all set to '1' to declare that the transmission ability at 28.8 Kb/s is provided and the transmission processing at 28.8 Kb/s is permitted. The bits x+24 to x+35 of the FIF of the TIS are '0'.

In S106, the RIS signal is received (f in FIG. 6). The FIF of the RIS signal is identical to the RIS c.

In S108, the TIS signal is transmitted (g in FIG. 6). It is now assumed that the bits x to x+23 of the FIF of the TIS signal are set to '1' so as to declare the transmission ability and the transmission processing at 28.8 Kb/s and that the bit x+24 of the FIF of the TIS signal is set to '1' and the bits x+25 to x+35 are set to '0' so as to determine the transmission at 28.8 Kb/s and inform it to the receiving station.

In accordance with the present embodiment, when one control circuit concurrently executes the local operation and the communication process by the multitask processing (dual operation), the transmission rate in the communication process is lowered, and when the local operation is completed during the communication and the transmission rate may be increased, the transmission rate is increased at the communication of the next page so that the communication is efficiently executed.

In the present embodiment, the facsimile apparatus having the complex function of executing the local operation and the communication process by one control circuit in the multitask process has been described.

As another embodiment, there is explained a facsimile apparatus in which data received from an external information processing terminal is transmitted to other facsimile apparatus (or other information processing terminal) while receiving the data from the first information processing terminal, or in which data received from the other facsimile apparatus (or other information processing terminal) is transferred to the first external information processing terminal while receiving the data from the facsimile apparatus (or the other information processing terminal).

Figure 13:
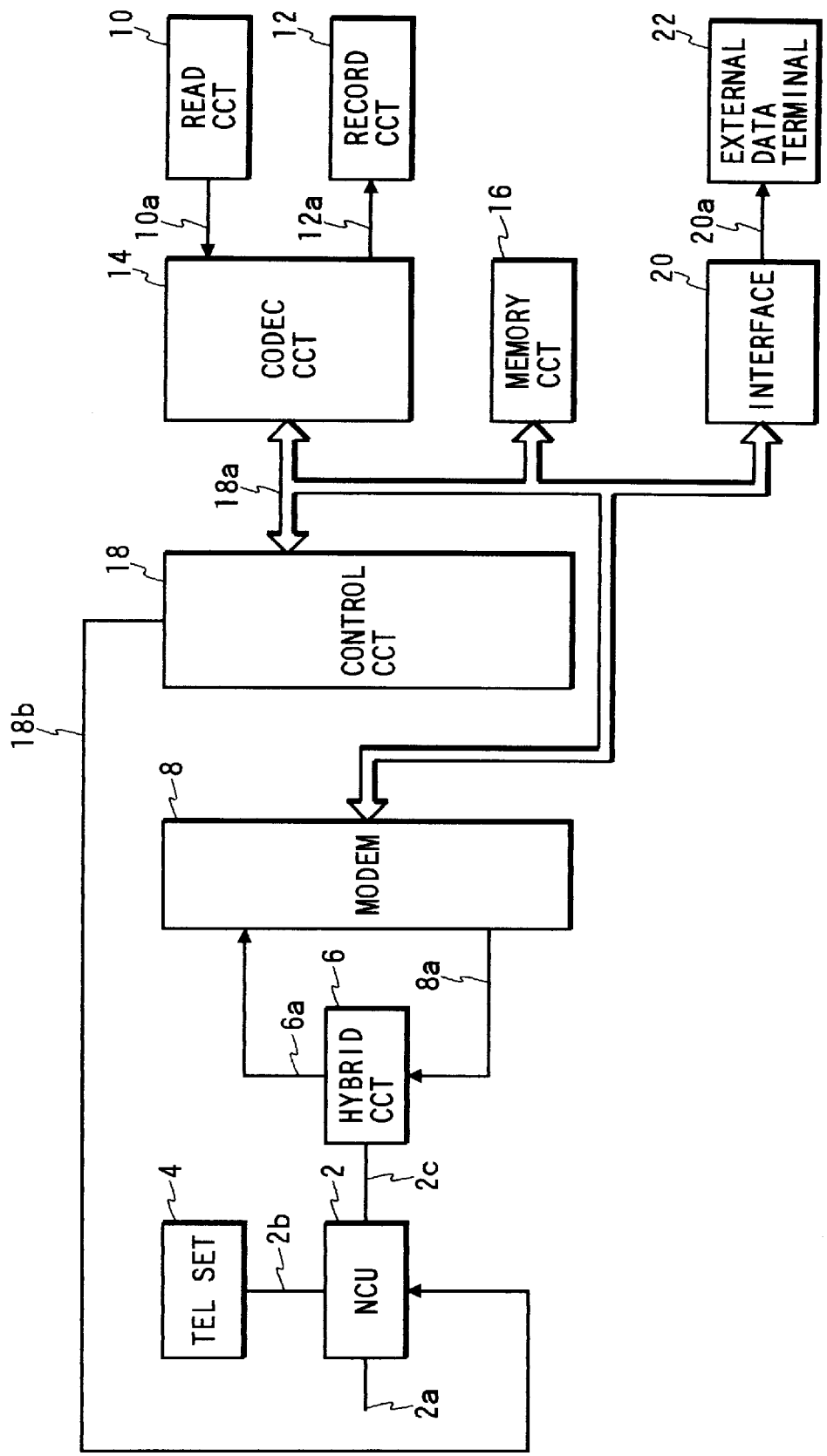
FIG. 13 shows a block diagram of a configuration of the facsimile apparatus in accordance with the another embodiment.

FIG. 13 shows a block diagram of a configuration of a facsimile apparatus in the other embodiment. In FIG. 13, the like numerals to those in FIG. 1 designate the like elements to those explained in FIG. 1 and the explanation thereof is omitted here.

Numeral 20 denotes an interface unit for communicating with an external information processing terminal (computer) 22 through a computer interface 20a.

The external information terminal (computer) 22 can parallelly execute the communication process via the facsimile apparatus and the local data processing by the multitask processing. When the external information processing terminal (computer) 22 concurrently executes the communication process and the local data processing by the multitask processing, the throughput of the communication process is lowered as it is in the facsimile apparatus of the above embodiment and the data transfer at 28.8 Kb/s is not permitted, and when a relatively light local processing (for example, data store to the memory) and the communication process are concurrently executed in the external information processing terminal (computer) 22, the data transmission at 28.8 Kb/s is permitted.

When the transmission is made from the external information processing terminal (computer) 22, the computer 22 informs to the facsimile apparatus the data transfer function (including function information of the transmission rate) which the computer 22 possesses. The computer 22 informs to the facsimile apparatus the information on the transmission rate which is currently executable.

The facsimile apparatus receives and stores the information indicating the function of the destination apparatus from the destination apparatus through the line 2a to recognize the transmission rate of the destination apparatus. The facsimile apparatus compares it with the transmission rate currently executable by the computer 22, selects the fastest transmission rate from the matching transmission rates, sets the modem 8 to the selected transmission rate and informs the selected transmission rate to the destination apparatus and external information processing terminal (computer) 22. In this manner, the transmission rate of the line 2a and the interface 20a is set and the data from the external information processing terminal 22 is transmitted to the line 2a through the facsimile apparatus. For each page, a protocol signal is exchanged between the external information processing terminal 22 and the facsimile apparatus, and between the facsimile apparatus and the destination apparatus. If the executable transmission rate has changed from the previous rate, the external information processing terminal 22 informs the change of the executable transmission rate to the facsimile apparatus, and informs the executable transmission rate to the facsimile apparatus. The facsimile apparatus compares the newly informed transmission rate executable by the computer 22 with the previously stored transmission rate of the destination apparatus, and if the newly informed transmission rate is acceptable by the destination apparatus, the transmission rate is changed in the procedure of the previous embodiment.

In the second embodiment, the function of the transmission rate which the external information processing terminal possesses and the transmission rate currently executable are informed from the external information processing terminal 22 to the facsimile apparatus. The facsimile apparatus sets the transmission rate to the destination apparatus or changes it in the course of communication by the protocol of the above embodiment and also sets the transmission rate of the interface 20a.

In accordance with the present embodiment, the transmission rate may be increased or decreased in accordance with the change in the state of the external information processing terminal and the function of the apparatus may be efficiently used.

It should be understood that the present invention is not limited to the above embodiments but various modifications may be made.

What is claimed is:

1. A data communication apparatus for setting a transmission rate via a communication line in accordance with a function of a remote destination apparatus and a quality of the communication line, comprising:

means for setting the transmission rate to the remote destination apparatus to one of a plurality of settable transmission rates in accordance with an execution ability for a communication process, the execution ability being changeable in accordance with an operating condition of said apparatus;

means for detecting a change in the execution ability for the communication process after the transmission rate has been set;

means for changing the transmission rate to a changed transmission rate in accordance with the change in the execution ability when the change in the execution ability for the communication process is detected in said detection means during the communication process; and means for, at a time when the transmission rate is changed to the changed transmission rate, informing the remote destination apparatus of the changed transmission rate and at least one of the settable transmission rates selected independently of the changed transmission rate.

2. A data communication apparatus according to claim 1, wherein said setting means informs the remote destination apparatus of information on a transmission rate possessed by said apparatus and information on a transmission rate currently executable in accordance with the execution ability for the communication process.

3. A data communication apparatus according to claim 2, wherein the transmission rate possessed by said apparatus includes a transmission rate in accordance with the V.34.

4. A data communication apparatus according to claim 1, wherein said setting means receives information on a transmission rate possessed by the remote destination apparatus and information on a transmission rate currently executable by the remote destination apparatus, and sets the transmission rate in accordance with the executable transmission rate.

5. A data communication apparatus according to claim 1, wherein said apparatus transmits data in pages and wherein said change means changes the transmission rate between pages.

6. A data communication apparatus according to claim 1, wherein data is received from an external information processing terminal and is communicated by said apparatus to the remote destination apparatus, and wherein the execution ability for the communication process depends on an execution ability of said external information processing terminal.

7. A data communication apparatus according to claim 1, wherein the execution ability for the communication process changes in response to execution of another process by said apparatus.

8. A data communication apparatus according to claim 1, wherein said informing means informs the remote destination apparatus of both the transmission rate corresponding to the current execution ability and a maximum transmission rate for the communication between said data communication apparatus and the remote destination.

9. A data communication method in a data communication apparatus for setting a transmission rate via a communication line in accordance with a function of a remote destination apparatus and a quality of a communication line, comprising the steps of:

setting the transmission rate to the remote destination apparatus to one of a plurality of settable transmission rates in accordance with an execution ability for a communication process, the execution ability being changeable in accordance with an operation condition of the communication apparatus;

detecting a change in the execution ability for the communication process after the transmission rate has been set;

changing the transmission rate in accordance with the change in the execution ability to a changed transmission rate when the change in the execution ability for the communication process is detected during the communication process; and informing, at a time when the transmission rate is changed to the changed transmission rate, the remote destination apparatus of the changed transmission rate and at least one of the settable transmission rates selected independently of the changed transmission rate.

10. A data communication method according to claim 9, further comprising the step of informing the remote destination apparatus of information on a transmission rate possessed by the communication apparatus and information on a transmission rate currently executable in accordance with the execution ability for the communication process.

11. A data communication method according to claim 10, wherein the transmission rate possessed by the communication apparatus includes a transmission rate in accordance with the V.34.

12. A data communication method according to claim 9, further comprising the steps of receiving from the remote destination apparatus information on a transmission rate possessed by the remote destination apparatus and information on a transmission rate currently executable, and setting the transmission rate in accordance with the executable transmission rate.

13. A data communication method according to claim 9, wherein said method transmits data in pages, said method further comprising the step of changing the transmission rate between pages.

14. A data communication method according to claim 9, further comprising the step of communicating data received from an external information processing terminal to the remote destination apparatus, wherein the execution ability for the communication process depends on an execution ability of the external information processing terminal.

15. A data communication method according to claim 9, wherein the execution ability for the communication process changes in response to execution of another process by the communication apparatus.

16. A data communication method according to claim 9, wherein said informing step informs the remote destination apparatus of both the transmission rate corresponding to the current execution ability and a maximum transmission rate for the communication between the data communication apparatus and the remote destination.

* * * * *

UNITED STATES PATENT AND TRADEMARK OFFICE
CERTIFICATE OF CORRECTION

PATENT NO. : 5,946,104

DATED : August 31, 1999

INVENTOR(S) : TAKEHIRO YOSHIDA     Page 1 of 2

It is certified that error appears in the above-identified patent and that said Letters Patent is hereby corrected as shown below:

COLUMN 3

Line 40, "while" should read --while it--.

Line 46, "record," should read --records,--.

COLUMN 4

Line 52, "judges" should read --judge--.

COLUMN 5

Line 65, "A specific" should read --Specific--.

COLUMN 6

Line 41, "embodiment." should read --embodiment,--.

UNITED STATES PATENT AND TRADEMARK OFFICE
CERTIFICATE OF CORRECTION

PATENT NO.  : 5,946,104

DATED       : August 31, 1999

INVENTOR(S) : TAKEHIRO YOSHIDA

It is certified that error appears in the above-identified patent and that said Letters Patent is hereby corrected as shown below:

<u>COLUMN 7</u>

Line 33, "transmitted" should read --are transmitted--.

Line 41, "signals" should read --signal--.

Signed and Sealed this

Second Day of May, 2000

Attest:

Attesting Officer

Q. TODD DICKINSON
Director of Patents and Trademarks